United States Patent [19]

Eifert

[11] Patent Number: 4,909,619

[45] Date of Patent: Mar. 20, 1990

[54] TILTABLE OUTSIDE REAR-VIEW MIRROR PARTICULARLY FOR TRUCKS

[75] Inventor: Klaus Eifert, Stadtprozelten, Fed. Rep. of Germany

[73] Assignee: Hohe KG, Collenberg, Fed. Rep. of Germany

[21] Appl. No.: 279,811

[22] Filed: Dec. 5, 1988

[30] Foreign Application Priority Data

Dec. 5, 1987 [DE] Fed. Rep. of Germany ... 8716105[U]

[51] Int. Cl.$^4$ ............................................. G02B 5/08
[52] U.S. Cl. ................................. 350/636; 350/632; 350/639; 248/479; 248/480
[58] Field of Search ............... 350/604, 606, 631, 632, 350/636, 637, 639; 248/900, 479, 480

[56] References Cited

U.S. PATENT DOCUMENTS 3,377,117  4/1968  Biscow .............................. 248/480

FOREIGN PATENT DOCUMENTS 1172081  8/1984  Canada ............................. 350/632
0090909  10/1983  European Pat. Off. ............ 350/637
0226747  10/1986  European Pat. Off. .
82099251  6/1982  Fed. Rep. of Germany .

Primary Examiner—Rodney B. Bovernick
Assistant Examiner—J. Ryan
Attorney, Agent, or Firm—Fleit, Jacobson, Cohn, Price, Holman & Stern

[57] ABSTRACT

According to the invention an outside rear-view mirror for a vehicle especially for a truck or a bus is provided which has a holder rod adapted to be fastened to the car body and a mirror housing mounted to a portion of the holder rod. The mirror housing accommodates a mirror glass the position of which may be adjusted by mechanical or electrical means. The mirror housing is formed with a shackle projecting towards said portion of the holder rod, and a first clamping piece is fixed to the shackle by two bolts which are spaced in the direction of said portion of the holder rod and which extend through a curved slot cut into the shackle. The length of the slot is substantially greater than the distance between the bolts. A second clamping piece may be mounted to the first clamping piece so that both clamping pieces grip the outer contour of said portion of the holder rod.

8 Claims, 2 Drawing Sheets

TILTABLE OUTSIDE REAR-VIEW MIRROR PARTICULARLY FOR TRUCKS

BACKGROUND OF THE INVENTION

1. Field of the Invention

The invention refers to an outside rear-view mirror for vehicles particularly for trucks. An adjustable mirror glass is mounted within the mirror which is surrounded laterally by a mirror housing. The mirror housing is fixed to a holder rod by clamping means gripping on the outer surface of the holder rod.

Trucks and busses often were driven alternatively by several drivers everyone having a different sitting position behind the steering-wheel of the vehicle. Different sitting positions differentiate among other things in their height relative to an outside rear-view mirror which is mounted to the driver's door of the vehicle so that the mirror glass has to be adjusted to the respective sitting position by the driver.

Electrical or mechanical means of the outside rear-view mirror are known which allow the necessary vertical adjustment of the mirror glass within the mirror housing as demanded by the actual sitting position of the driver. Such adjustment of the mirror glass to the actual driver's sitting position results in a normal mirror glass position within an angular range of possible up and down movements of the mirror glass. In the event such normal mirror glass position is close to one end of said angular range, the driver cannot maneuver the mirror glass to the desired angular extend from his normal mirror glass position. This is a drawback of known outside rear-view mirrors because every driver should have the option of maneuvering the mirror glass upwardly or downward within a given angular range.

2. Desecrition of the Related Art

German Gebrauchsmusterschrift 82 09 925 discloses an outside rear-view mirror the mirror housing of which is fixed to the vertical portion of a holder rod by a clamping piece. The holder rod is tiltably mounted to the vehicle body. Furthermore, an outside rea-rview mirror of similar kind is known wherein a clamping means grips a portion of the holder rod. The clamping means is fixed to two spaced shackles by means of a bolt which are mounted to the mirror housing in a way that allows tilting of the mirror housing including the mirror glass upwardly and downwardly when the bolt is loosened.

This type of fastening of the mirror housing to the portion of the holder rod has the disadvantage that the bolt easily may loosen as a result of vibrations imparted when the vehicle is run. Thus, the fastening of the mirror housing to the holder rod is not sufficiently safe for all occurring driving conditions. Moreover, the clamping means is of complex construction.

SUMMARY OF THE INVENTION

It is therefore an object of the invention to provide means for safely fastening a mirror housing to a portion of the holder rod of an outside rear-view mirror. Such means should also allow if desired and up and down and an angular adjustment of the mirror housing relative to said portion of the holder rod.

According to the invention an outside rear-view mirror for a vehicle especially for a truck or a bus is provided which has a holder rod adapted to be fastened to the car body and a mirror housing mounted to a portion of the holder rod. The mirror housing accommodates a mirror glass the position of which may be adjusted by mechanical or electrical means. The mirror housing is formed with a shackle projecting towards said portion of the holder rod, and a first clamping piece is fixed to the shackle by two bolts which are spaced in the direction of said portion of the holder rod and which extend through a curved slot cut into the shackle. The length of the slot is substantially greater than the distance between the bolts. A second clamping piece may be mounted to the first clamping piece so that both clamping pieces grip the outer contour of said portion of the holder rod. In the outside rear-view mirror according to the invention the mirror housing is safely mounted to the holder rod which maintains its position irrespective of any vibrations transferred from the car body to the mirror housing. The mirror housing may be adjusted to the driver's position by tilting relative to the holder rod along a curved path defined by the slot. Thereby, the angular range of adjustability of the mirror glass is fully available for every drive independent of his sitting position behind the steering wheel.

In a preferred embodiment of the invention the imaginary center of curvature of the curved slot is located inside the mirror housing. Moreover it is preferred to form both clamping pieces substantially as plates, each having a longitudinally embossed groove so that the portion of the holder rod may be safely accommodated between the grooves of both clamping pieces. More advantageously, the clamping plates, for mounting the mirror housing to the portion of the holder rod, may be connected by a first set of bolts penetrating though sections of both clamping plates which extend beyond said portion of the holdler rod opposite to the mirror housing. A second set of bolts may be provided for coupling both clamping plates together and to the shackle. The bolts of said second set may penetrate sections of the clamping plates proximate to the mirror housing and may penetrate the curved slot of the shackle. According to this embodiment of the invention loosening of the bolts of the first set looses the gripping force exerted by the clamping plates onto the holder rod and therefore allows up and down shifting of the mirror housing along said portion. On the other hand loosening of the bolts of the second set enables, in addition to the up and down movements of the mirror housing along the holder rod, a tilting adjustment of the mirror housing relative to the holder rod over an angular range of preferably 20 degrees.

In a still further preferred embodiment of the invention the mirror housing is mounted to an inner backing rod to which the shackle is welded substantially parallel to the axis of the backing rod. Preferably, the mirror housing is provided, opposite to the mirror glass with an opening through which the shackle at least partially may extend. Last not least, a streamlined trough-like protection cap may be attached releasably to the mirror housing opposite to the mirror glass for shielding the shackle and the clamping pieces from dust, rain and similar adverse influences.

BRIEF DESCRIPTION OF THE DRAWINGS

A presently preferred embodiment of the invention is described in detail hereinafter with reference to the accompanying drawings which show :

FIG. 2: a top view of the outside rear-view mirror according to

FIG. 1, partially in horizontal section;

DESCRIPTION OF THE PREFERRED EMBODIMENT

Figure 1:
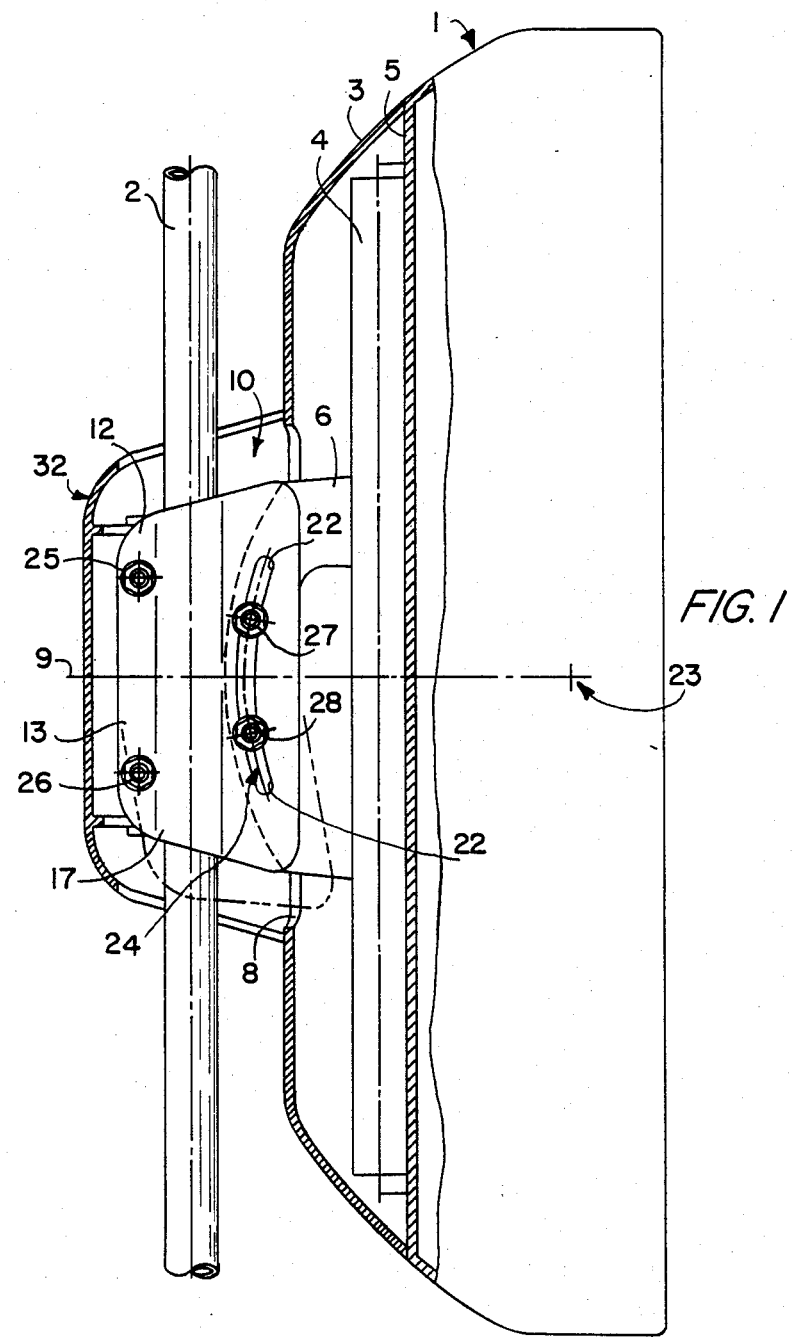
FIG. 1: A side view of an outside rear-view mirror with a protection cap, partially in vertical section.

A mirror housing, entirely designated as 1, accommodates in known manner a not shown mirror glass the light reflecting surface of which may be viewed at from the right side of FIG. 1. The mirror housing 1 is fixed to a straight portion 2 of a holder rod in a kind to be described. The holder rod may have a shape as shown in German Gebrauchsmusterschrift G 82 09 925.1 or in European patent application 86114485.5. Both of the free ends of the holder rod are adapted to be mounted to a driver's door of a truck or a bus. The mirror housing 1 has a conventional concave shape. A front portion of the mirror housing 1 accommodates not shown means for fastening the mirror glass and not shown adjustment means for adjusting the position of the mirror glass relative to the housing. A separating wall 5 of the mirror housing 1 is mounted to a backing rod 4 which supports the mirror housing 1. A shackle 6 has the form of a metal plate in an extended U the legs of which are welded to a middle portion of the backing rod 4. The shell of the mirror housing 1 is elongated rearwardly beyond the separating wall 5 to form a section 3 which surrounds in a streamlined form the backing rod 4 and a greater portion of the shackle 6. The base 7 of the shackle 6 protrudes through a rearward opening 8 of the shell portion 3 and is slightly curved to a concave bow. An imaginary line 9 indicates a plane of symmetry transverse to the axis of portion 2 of the holder rod so that the mirror housing, the shackle, the clamping pieces 12, 14 and the protection cap 32 are symmetric to the plane defined by line 9 when the mirror housing 1 assumes a middle position as shown in FIG. 1. Symmetrically to line 9 two holes are drilled through the base 7 which are spaced parallel to backing rod 4.

Fastening means 10 allow clamping the mirror housing 1 to the portion 2 of the holder rod and include two clamping pieces 12, 14. Each clamping pieces 12, 14 is formed from a substantially rectangular metal plate into which a longitudinal semi-circular groove 17, 19 is pressed. The shape of each of the grooves 17, 19 is adapted to the outer contour of the cylindrical outer surface of said portion 2 of the holder rod.

Into the first clamping piece 12 two through holes are drilled which are, when the mirror housing 1 is clamped to portion 2 according to FIG. 1, spaced parallel to the backing rod 4 and to the portion 2 which, consequently, runs parallel to backing rod 4. Said through holes are drilled into clamping piece 12 in the outer marginal section 13 thereof which, relative to portion 2, is opposite to shackle 6. A curved slot 22 is cut into clamping piece 12 opposite to the through holes with respect to groove 17. According to FIG. 1 slot 22 extends to either side of line 9 to the same distance. The imaginary center of curvature of the arc-like slot 22 lies within the mirror housing beyond the separating wall 5 at 23.

Figure 2:
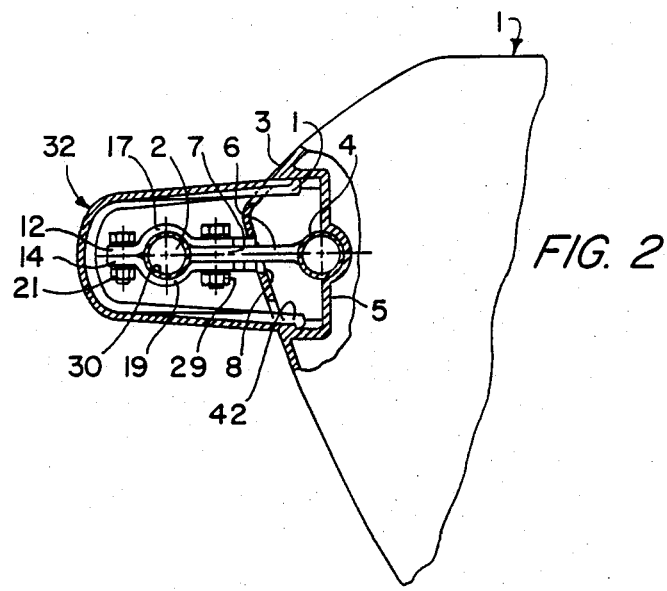
Figure 3:
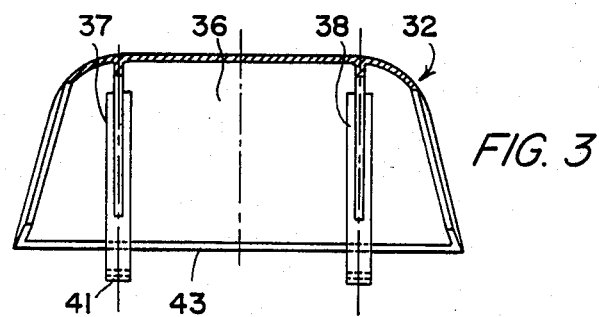
FIG. 3: a longitudinal cross section of the protection cap.
Figure 4:
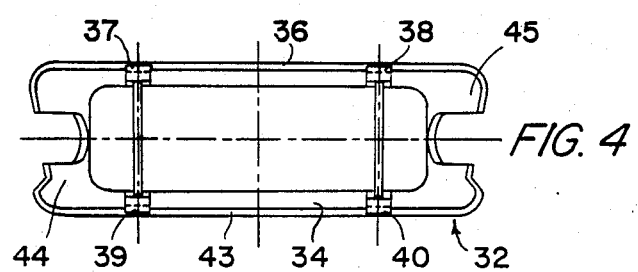
FIG. 4: a view into the inside of the protection cap.

The second clamping piece 14 is formed identical to the first clamping piece 12 and, therefore, has two through holes on one side on the semi-circular groove 19 and has an arc-like curved slot 24 on the other side of groove 19. As to the length of both slots 22, 24 it is to be understood that it is substantially greater than the distance between said two through holes formed in base 7 of shackle 6. Both clamping plates 12, 14 are formed such that the portion into which the slot 22, 24 is cut may abut to the flat lateral surface of base 7 of shackle 6 (FIG. 2).

To mount the mirror housing 1 to portion 2 of the holder rod, a first bolt 25 is inserted into a first aligned pair of through holes of the clamping pieces 12, 14, and a second bolt 26 is inserted to a second aligned pair of through holes of the clamping pieces 12, 14. To each of both bolts a nut 21 is screwed to tighten the bolts and to connect clamping pieces 12, 14 along margin 13 thereof. A third bolt 27 is inserted through the first longitudinal slot 22 and through the first through hole of shackle 6 and through the second longitudinal slot 24 and is tightened by a nut 29. Also a fourth bolt 28 is inserted through the first longitudinal slot 22 and through the second through hole of shackle 6 and through the second longitudinal slot 24 and is tightened by a nut. If all of the four bolts and nuts are tightened (FIG. 2) both clamping pieces grip around the outer contour of portion 2 of the holder rod. For protecting any coating of portion 2 a plastic shield 30 may be shrunk on portion 2 over a length which corresponds at least to the length of each clamping piece 12, 14. In such a case the clamping pieces grip the plastic sheld instead of portion 2 as such.

It can be seen from FIG. 1 that the distance between inserted bolts 27, 28 along portion 2 of the holder rod is about half of the length of each of the slots 22, 24. The annular range of the length of slot 22, 24 corresponds approximately to 20 degrees symmetrically to line 9.

If it is desired to shift the mirror housing along portion 2 it is only necessary to loosen nuts 21 and thereby releasing the clamping force exerted by the clamping pieces 12, 14.

On the other hand if the mirror housing 1 has to be tilted for adjusting its position to a specific sitting position of a driver of the truck only bolts 27, 28 should be loosened so that the shackle 6 together with the mirror housing 1 may be turned such that bolts 27, 28 run within slots 22, 24. As may be clearly seen from FIGS. 1 and 2 not only bolts 25, 26 but also bolts 27, 28 are outside of opening 8 and are therefor freely accessible from the outside by a suitable tool.

To protect the fastening means 10 and the interior of the shell portion 3 from influences of the atmosphereic conditons, a cap 32 is provided which, when attached to the mirror housing covers clamping pieces 12, 14 and the opening 8 together with the clamped portion of the holder rod. The cap has a streamlined trough-like form with opposing longitudinal side walls 34, 36 and shorter transverse walls 44, 45. An incut is made in each of the walls 44, 45 of a width that portion 2 of the holder rod may extend therethrough. The plastic cap 32 is formed with inwardly elastic fingers 37, 38, 39, 40 projecting from the inner surfaces of the longitudinal side walls, 34, 36 in spaced relationship. The free ends of said fingers are each formed with outwardly projecting noses 41, 42 each of which may engage behind an inner shoulder of the shell portion 3 when the fingers are inserted through corresponding additional openings in said shell. When said hook-like noses 41, 42 snap behind said shoulders, the continuous edge 43 of the cap abuts tightly the shell portion 3 arround the opening 8 and the additional openings through which the fingers extend. Thus, cap 32 may be snapped on shell portion 3 and may be released therefrom by bending inwardly the opposing longitudinal walls 34, 36 whereby the noses 41, 42 are released from engagement with the corresponding shoulders of the shell portion 3.

The invention allows a number of modifications without departing from the spirit thereof. Thus, the slots 22, 24 may be given a curvature such that the imaginery center thereof lies outside the mirror housing 1 beyond the portion 2 of the holder rod.

What is claimed is:

1. An outside rear-view mirror for vehicles particularly for trucks or busses, said rear-view mirror comprising: an adjustable mirror glass mounted to and accommodated within a mirror housing, a holder rod to which said mirror housing is mounted by two clamping pieces gripping around a portion of said holder rod, each clamping piece having at least two spaced bores and a curved slot such that said portion extends between said bores and said slot when the clamping pieces grip said portion, a shackle being mounted to the mirror housing and having two bores of a distance which is considerably shorter than the length of each of said slots in the clamping pieces so that bolts may be inserted through the bores of the shackle and through each of the curved slots for mounting the mirror housing to said portion.

2. An outside rear-view mirror according to claim 1, wherein the imaginary center of curvature of said curved slot is located within said mirror housing.

3. An outside rear-view mirror according to claim 1, wherein both of said clamping pieces are formed from plates, each of said clamping pieces having a vertical groove adapted to the outer contour of said portion and which are screwed together on said portion of said holder rod on the opposite side of said mirror housing.

4. An outside rear-view mirror according to claim 3, wherein said shackle is fixed to a backing rod to which said mirror housing is mounted.

5. An outside rear-view mirror according to claim 4, wherein said clamping pieces and said shackle are covered by a protection cap which is detachably mounted to said mirror housing and which has facing incuts so that said portion of said holder rod may pass through the incuts.

6. An outside rear-view mirror according to claim 1, wherein said shackle is fixed to a backing rod to which said mirror housing is mounted.

7. An outside rear-view mirror according to claim 1, wherein said mirror housing has an opening through which at least a part of said shackle extends.

8. An outside rear-view mirror according to claim 1, wherein said clamping pieces and said shackle are covered by a protection cap which is detachably mounted to said mirror housing and which has facing incuts so that said portion of said holder rod may pass through the incuts.

* * * * *